Patented May 3, 1938

2,116,104

UNITED STATES PATENT OFFICE 2,116,104

3.5-DIIODO-4-HYDROXY ACYLOPHENONE COMPOUNDS AND METHOD FOR PRODUCING THE SAME

Max Dohrn, Berlin-Charlottenburg, and Paul Diedrich, Finkenkrug, (Osthavelland), Germany, assignors to Schering A. G., Berlin, Germany, a corporation of Germany No Drawing. Application July 10, 1936, Serial No. 90,004. In Germany March 13, 1935

23 Claims. (Cl. 260—131)

This invention relates to 3.5-diiodo-4-hydroxy acetophenone, its homologues and their derivatives substituted in the hydroxy group, and a method for producing the same.

Iodine derivatives of hydroxy-acetophenones substituted in the 3 and 5 positions have not hitherto been described. Experiments have shown that by iodination of o- and m-hydroxy-acetophenone only mono-iodo acetophenones are produced. In accordance with the present invention, however, from the p-hydroxy-acetophenone by iodination 3.5-diiodo-4-hydroxy-acetophenone is obtained in good yield. The iodination is carried out, for example, in such a manner that 2 mols of iodine monochloride are allowed to react at ordinary temperature upon p-hydroxy-acetophenone dissolved in dilute hydrochloric acid. The 3.5-diiodo-4-hydroxy-acetophenone then separates in a short time in a practically quantitative yield.

Another object of this invention consists in subjecting instead of the above mentioned p-hydroxy-acetophenone, its homologues to the action of iodinating agents.

According to a further feature of the invention the hydrogen of the hydroxyl group in these compounds can be substituted by other residues such as alkyl, alkoxy, alkyl-carboxy, alkyl-sulfonic, aryl, heterocyclic and other residues; in general, the hydroxy is replaced by a group which on hydrolysis is replaced by a hydroxy group.

The introduction of the substituents into the hydroxyl group takes place advantageously by interaction of suitable salts of 3.5-diiodo-4-hydroxy-acetophenone or its homologues in alcoholic or benzene suspension with the corresponding halogenides or also by direct interaction of the components without application of solvents.

The products of the present invention, the 3.5-diiodo-4-hydroxy-acetophenone, its homologues and their substitution products are intended to find application as intermediate products in the manufacture of disinfecting agents, pharmaceutical products, X-ray contrast media and the like.

The following examples illustrate the invention without, however, limiting the same to them.

Example 1

3.5-diiodo-4-hydroxy-acetophenone, the structural formula being

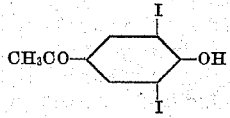

13.6 grams of 4-hydroxy-acetophenone are dissolved in 140 ccs. of 20% hydrochloric acid and 1.4 litres of water and treated with stirring at room temperature with a solution of 33 grams of iodine monochloride in 50 ccs. of 20% hydrochloric acid drop by drop. The diiodo compound immediately separates in a crystalline form and on recrystallization from alcohol for purification, is obtained in colourless needles of M. P. 172–173° C. The yield amounts to 36.7 grams—95% of the theory. The 3.5-diiodo-4-hydroxy-acetophenone is easily soluble in ether and chloroform, more difficultly soluble in benzene and alcohol; it is insoluble in water.

Example 2

3.5-diiodo-4-methoxy-acetophenone, whose structural formula is

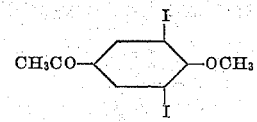

42.6 grams of the potassium salt of 3.5-diiodo-4-hydroxy-acetophenone are heated in 150 ccs. of absolute alcohol with 14.5 grams of methyl iodide for 6 hours to boiling. From the hot filtered solution the methoxy derivative separates out in colourless needles. These are filtered with suction, washed with dilute sodium carbonate solution and water and recrystallized from alcohol, forming needles of M. P. 97–98° C.

Example 3

3.5-diiodo-4-ethoxy-acetophenone, having the structural formula

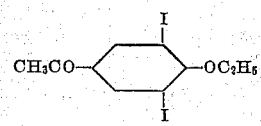

42.6 grams of the potassium salt of 3.5-diiodo-4-hydroxy-acetophenone are heated in 150 ccs. of absolute alcohol with 16 grams of ethyl iodide and the solution worked up as described in Example 2, giving needles of M. P. 93–94° C.

Example 4

3.5-diiodo-4-hydroxy-methyl-ether-acetophenone, whose formula is

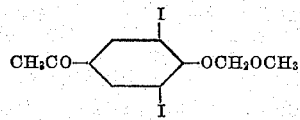

42.6 grams of the potassium salt of 3.5-diiodo-4-hydroxy-acetophenone are treated in the hot in 150 ccs. of benzene with 8.1 grams of chloromethyl-ether. It is thereupon filtered hot and the benzene distilled off. The residue after treatment with dilute sodium carbonate solution is recrystallized from alcohol forming needles of M. P. 96–97° C.

Example 5

3.5 - diiodo - 4 - hydroxy-ethoxy-acetophenone, having the structural formula

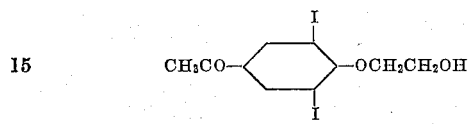

42.6 grams of the potassium salt of diiodo-hydroxy-acetophenone are heated on the water bath with 30 grams of ethylene chlorhydrin until the potassium salt has disappeared. The mass is poured into water, rendered alkaline with sodium carbonate and extracted with chloroform. The chloroform residue after some time becomes crystalline and has the M. P. 94–95° C.

Example 6

3.5-diiodo-1-aceto-4-phenoxy-acetic acid of the formula

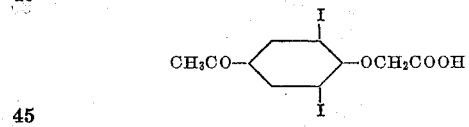

42.6 grams of the potassium salt of diiodo-hydroxy-acetophenone are boiled under reflux with 50 ccs. of chloracetic acid ethyl ester until the reaction is complete. The hot filtered solution leaves on concentration under reduced pressure a light brown oil which soon solidifies to crystals. Recrystallization from dilute alcohol yields the 3.5-diiodo-1-aceto-4-phenoxy acetic acid ethyl ester in needles of M. P. 104.5° C. The hydrolysis of the ester takes place by boiling for 1 hour with 20 times the quantity of hydrochloric acid (D—1.19). The free 3.5-diiodo-1-aceto-4-phenoxy-acetic acid forms on recrystallization from alcohol light yellow prisms of M. P. 178.5° C.

Example 7

3.5 - diiodo-4-hydroxy-1-(γ-hydroxy - butyro-) phenone, having the structural formula

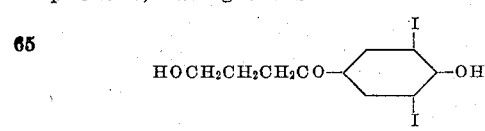

18.0 grams of 4-hydroxy-1-(γ-hydroxy-butyro-)phenone of the M. P. 144° C., as it is obtained by rearranging γ-bromo-butyro-phenol by means of aluminum chloride are dissolved in 150 ccs. of 20% hydrochloric acid and 1.5 liters of water. To this solution there is added while stirring a solution of 33 grams of iodine monochloride in 50 ccs. of 20% hydrochloric acid at room temperature. The diiodo compound precipitates immediately and is further purified by recrystallization from dilute alcohol. The colourless needles of 3.5-diiodo-4-hydroxy-1-(γ-hydroxy-butyro-)phenone contain 1 mol. of water of crystallization and have a M. P. of 106° C. (the γ-bromo-butyro-phenol used as starting material for the production of 4-hydroxy-1-(γ-hydroxy-butyro-)phenone, is produced from phenol-γ-bromo-butyryl-chloride and has a boiling point of 173–175° C. at a pressure of 15 mm.).

In the same manner as described above the 4-hydroxy-1-propiophenone and the 4-hydroxy-1-butyro-phenone, both obtained by rearranging the corresponding propio- or butyro-phenols, for instance, with metal halogenides such as aluminum chloride, or other homologue of the aceto-phenone may be converted into the corresponding diiodo compounds.

The above reactions may be represented as follows:

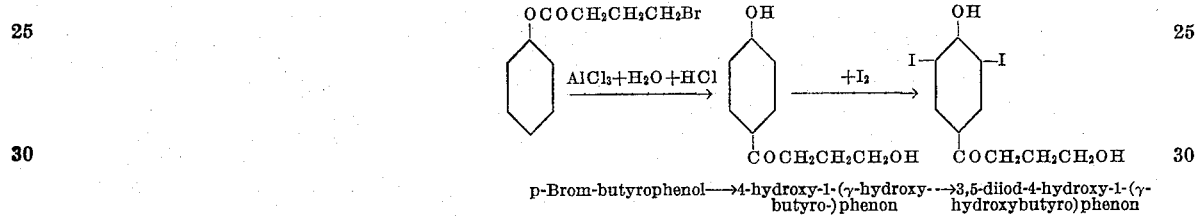

p-Brom-butyrophenol→4-hydroxy-1-(γ-hydroxy-→3,5-diiod-4-hydroxy-1-(γ-butyro-)phenon   hydroxybutyro)phenon Of course, many changes and variations in the reaction conditions, the agents used, the solvents, the reaction temperature, the purification methods and the like may be employed by those skilled in the art in accordance with the principles set forth herein and in the claims annexed hereto.

What we claim, is:

1. A method for the production of 3.5-diiodo-4-hydroxy acylophenone compounds, comprising subjecting 4-hydroxy-acylophenone compounds to the action of an iodinating agent capable of introducing two iodine atoms into the molecule of such compounds.

2. A method according to claim 1, wherein iodine chloride is used as iodinating agent.

3. A method for the production of 3.5-diiodo-4-hydroxy acetophenone compounds, comprising subjecting 4-hydroxy acetophenone to the action of an iodinating agent capable of introducing two iodine atoms into the molecule.

4. A method for the production of 3.5-diiodo-4-hydroxy acetophenone compounds, comprising subjecting 4-hydroxy acetophenone to the action of an iodinating agent capable of introducing two iodine atoms into the molecule and replacing the hydroxy group with a group which on hydrolysis can be reconverted into the hydroxy group.

5. A method for the production of 3.5-diiodo-4-hydroxy acetophenone compounds, comprising subjecting 4-hydroxy acetophenone to the action of an iodinating agent capable of introducing two iodine atoms into the molecule and reacting the 3.5-diiodo-4-hydroxy acetophenone so obtained with an etherifying agent.

6. A method for the production of 3.5-diiodo-4-hydroxy acetophenone compounds, comprising subjecting 4-hydroxy acetophenone to the action of an iodinating agent capable of introducing two iodine atoms into the molecule and reacting the 3.5-diiodo-4-hydroxy acetophenone so obtained with a compound selected from the group consisting of halogenated carboxylic and sulfonic acids and their esters.

7. A method for the production of 3.5-diiodo-4-hydroxy acylophenone compounds, comprising subjecting 4-hydroxy acylophenone compounds to the action of an iodinating agent capable of introducing two iodine atoms into the molecule of such compounds, and reacting the 3.5-diiodo-4-hydroxy acylophenone compound so obtained with an etherifying agent.

8. A method for the production of 3.5-diiodo-4-hydroxy acylophenone compounds, comprising subjecting 4-hydroxy acylophenone compounds to the action of an iodinating agent capable of introducing two iodine atoms into the molecule of such compounds, and reacting the 3.5-diiodo-4-hydroxy acylophenone compounds so obtained with a compound selected from the group consisting of halogenated carboxylic and sulfonic acids and their esters.

9. A method for the production of 3.5-diiodo-4-hydroxy acylophenone compounds, comprising effecting rearrangement of γ-halogeno acylophenol compounds in the presence of metal halogenides, and subjecting the 4-hydroxy acylophenone compounds obtained thereby to the action of an iodinating agent capable of introducing two iodine atoms into the molecule of such compounds.

10. A method for the production of 3.5-diiodo-4-hydroxy acylophenone compounds, comprising effecting rearrangement of γ-halogeno acylophenol compounds in the presence of metal halogenides, and subjecting the 4-hydroxy acylophenone compounds obtained thereby to the action of an iodinating agent capable of introducing two iodine atoms into the molecule of such compounds and replacing the hydroxy group with a group which on hydrolysis can be reconverted into the hydroxy group.

11. A 3.5-diiodo-4-hydroxy acylophenone compound of the general formula R.CO.C$_6$H$_2$I$_2$.OR′ wherein R indicates a hydrocarbon radical and OR′ an etherified hydroxyl group.

12. A 3.5-diiodo-4-hydroxy acetophenone compound of the general formula CH$_3$.CO.C$_6$H$_2$I$_2$.OR′ wherein OR′ indicates an etherified hydroxyl group.

13. A 3.5-diiodo-4-hydroxy acetophenone compound of the general formula CH$_3$.CO.C$_6$H$_2$.I$_2$.OH and the structural formula

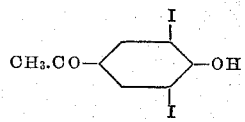

having a melting point of 172–173° C.

14. A 3.5-diiodo-4-hydroxy ethoxy acetophenone of the general formula

CH$_3$.CO.C$_6$H$_2$I$_2$.O.CH$_2$.CH$_2$.OH and the structural formula

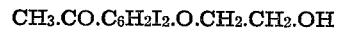
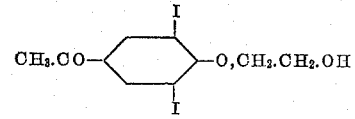

having a melting point of 94–95° C.

15. A 3.5-diiodo-4-hydroxy-1-(γ-hydroxy butyro-)phenone of the general formula

HO.CH$_2$.CH$_2$.CH$_2$.CO.C$_6$H$_2$I$_2$.O and the structural formula

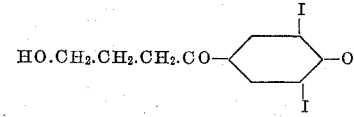

having a melting point of about 106° C.

16. The method according to claim 3 wherein the iodinating agent is iodine chloride.

17. The method of producing 3.5-diiodo-4-alkoxy acylophenone compounds which comprises reacting upon a metal compound of a 3.5-diiodo-4-hydroxy acylophenone with an alkyl ester capable of removing the metal.

18. A 3.5-diiodo-4-hydroxy acylophenone compound of the general formula RCOC$_6$H$_2$I$_2$.OR′ corresponding to the structural formula

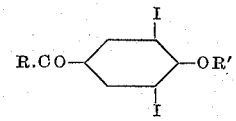

wherein R is an aliphatic radical capable of forming part of an acyl group and R′ is an organic substituent group capable of being replaced by hydrogen with the aid of hydrolysis.

19. A 3.5-diiodo-4-hydroxy acylophenone compound of the general formula RC$_6$H$_2$I$_2$OR′ wherein R is an acyl radical and OR′ is a member of the group consisting of hydroxyl and groups which by hydrolysis can be replaced by hydroxyl.

20. A 3.5-diiodo-4-hydroxy acylophenone compound as defined in claim 11, wherein R′ is a hydrocarbon radical.

21. A 3.5-diiodo-4-hydroxy acetophenone compound as defined in claim 11, wherein R′ is an acid group.

22. A 3.5-diiodo-4-hydroxy acylophenone compound as defined in claim 12, wherein R′ is a hydrocarbon radical.

23. A 3.5-diiodo-4-hydroxy acetophenone compound as defined in claim 12, wherein R′ is an acid group.

MAX DOHRN.
PAUL DIEDRICH.